United States Patent  (10) Patent No.: US 6,194,478 B1
Cox et al.  (45) Date of Patent: Feb. 27, 2001

(54) DOCUMENT FEEDING COMPONENT AND METHOD OF MANUFACTURE THEREOF

(75) Inventors: Debra A. Cox, Baltic; William D. Smith, Abington, both of CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 09/439,660

(22) Filed: Nov. 15, 1999

Related U.S. Application Data

(60) Continuation-in-part of application No. 09/306,559, filed on May 6, 1999, now Pat. No. 6,087,411, which is a division of application No. 08/999,415, filed on Dec. 29, 1997, now Pat. No. 5,993,952.

(51) Int. Cl.[7] .................................. C08J 9/16; C08J 9/18; C08J 9/02
(52) U.S. Cl. ....................... 521/189; 521/50; 521/145; 521/149; 521/156; 271/109; 428/906; 428/305.5
(58) Field of Search .................... 521/149, 50, 145, 521/189, 156; 428/305.5, 906; 271/109

(56) References Cited

U.S. PATENT DOCUMENTS

| | | | |
|---|---|---|---|
| 3,691,113 | * 9/1972 | Willis | 260/2.5 R |
| 3,988,817 | 11/1976 | Thettu . | |
| 4,173,058 | 11/1979 | Stieger . | |
| 4,252,378 | * 2/1981 | DeBolt et al. | 301/63 DD |
| 4,287,649 | 9/1981 | Kohler . | |
| 4,303,721 | * 12/1981 | Rodrriquez et al. | 428/213 |
| 4,372,246 | 2/1983 | Azar et al. . | |
| 4,812,357 | * 3/1989 | O'Rell et al. | 428/246 |
| 5,089,851 | * 2/1992 | Tanaka et al. | 355/219 |
| 5,347,927 | * 9/1994 | Berna et al. | 101/401.1 |
| 5,363,176 | * 11/1994 | Ishihara et al. | 355/219 |
| 5,609,554 | * 3/1997 | Hayashi et al. | 492/56 |
| 5,666,606 | * 9/1997 | Okano et al. | 399/174 |
| 5,765,077 | * 6/1998 | Sakurai et al. | 399/176 |

\* cited by examiner

*Primary Examiner*—James J. Seidleck
*Assistant Examiner*—Sanza L. McClendon
(74) *Attorney, Agent, or Firm*—Cantor Colburn LLP

(57) ABSTRACT

A document feed component is presented comprising a foamed epichlorohydrin elastomer, a curing agent, and a blowing agent, wherein the document feed component has a dynamic coefficient of friction in the range of about 1.0 to about 3.0, a Shore O hardness in the range of about 2 to about 85, a compression set of less than about 12%, and a resistance to wear of less than about 0.05 g/hr. The elastomer optionally further includes activators, polymerization accelerators, and a filler material. An important feature of the present invention is that the use of a foamed epichlorohydrin elastomer does not require the use of processing aids and migratory additives. Consequently, the document feed component has the advantage of not contaminating paper or other media with which they come into contact, even for extended periods of time, while maintaining other advantageous properties, such as a high dynamic coefficient of friction, low hardness, low % compression set, and excellent resistance to ultraviolet light and ozone. The document feed component may be shaped as a roller, wheel, belt, pad or the like.

32 Claims, 1 Drawing Sheet

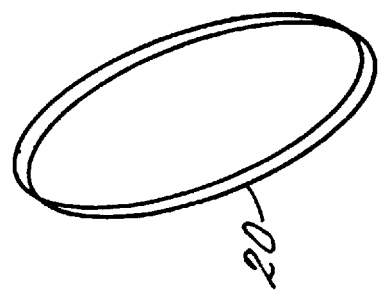
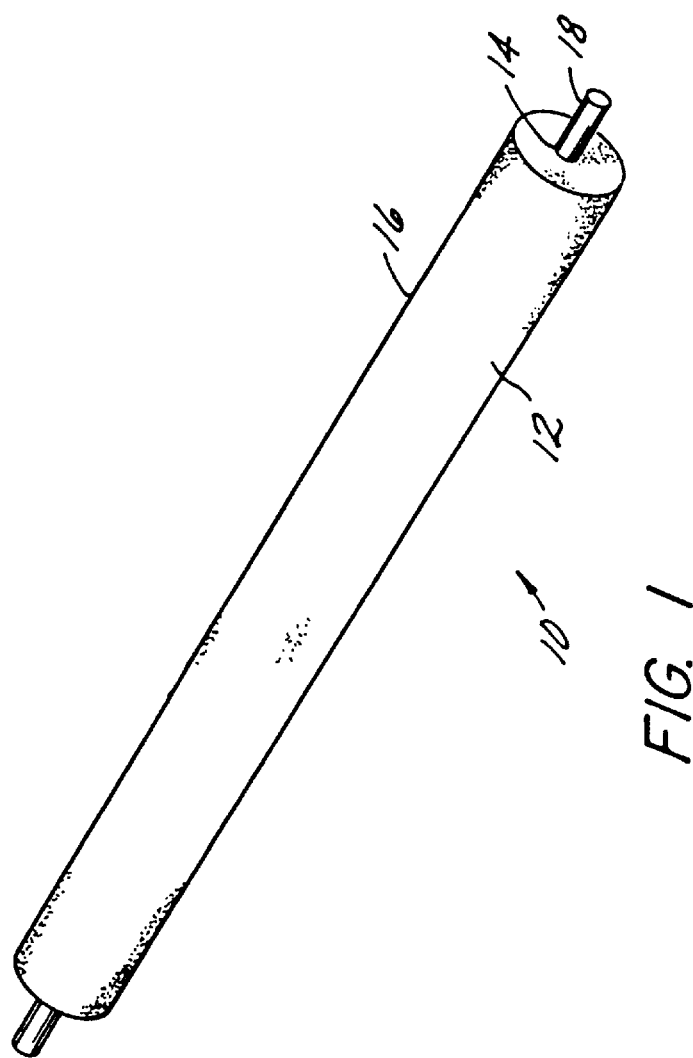

DOCUMENT FEEDING COMPONENT AND METHOD OF MANUFACTURE THEREOF

CROSS REFERENCE TO RELATED APPLICATION

This application is a continuation-in-part of U.S. patent application Ser. No. 09/306,559 filed May 6, 1999, now U.S. Pat. No. 6,087,411, which is a divisional of U.S. patent application Ser. No. 08/999,415 filed Dec. 29, 1997, now U.S. Pat. No. 5,993,952 which are incorporated by reference herein.

BACKGROUND OF THE INVENTION

1. Field of the Invention

This invention relates generally to the field of elastomeric rolls and the like used for feeding paper sheets, photographic paper or other documents and a method of manufacture thereof. More particularly, this invention relates to a new and improved sheet feeding roller or other member comprised of a foamed epichlorohydrin elastomer without processing aids and migratory additives, wherein the roller or other member is characterized by a high initial coefficient of friction and low hardness.

2. Brief Description of the Related Art

An enormous number of paper sheets and other documents such as currency, personal checks and films are handled by a variety of document handling devices, including office copiers, automatic teller machines, typewriters, printers, calculators, computers and many other types of business equipment. As used herein, the word "document" means any thin sheet of material, such as paper, including photographic paper, the other documents mentioned previously, and other similar sheets of material. Often associated with the document feeding of these devices are elastomeric rolls, wheels, pads, belts and the like, which act to convey the documents along a desired path. Documents are delivered into the document handling devices by the elastomeric feed components, such as a roll, through frictional force which develops from imparting motion to the feed roll while it is in contact with the document. The document is moved forward when the feed roll is rotated, if the frictional force is sufficiently high to prevent slippage. The frictional force increases with increased elastomer coefficient of friction (COF) and with increased normal force exerted on the elastomer/document interface.

Although the remaining description herein uses elastomeric feed rolls to illustrate the pertinent concepts, feed rolls are used to simplify the description of the field of document feeding, and not to imply any limitation of this geometry. It should be understood that the same concepts apply to wheels, belts, pads, and other geometries of components used for document feeding.

The use of an elastomeric material in the construction of a feed roll is well known in the art, and various elastomers have been used in the fabrication of feed rollers. For example, in U.S. Pat. No. 4,173,058 to Stieger there is disclosed a method for manufacturing photographic film processing rollers. An adhesive primer is applied to a cylindrical metal rod and a melted polymer comprising an elastomeric urethane resin on its surface is deposited on the metal rod by means of a cross-head extrusion die. The extruded coating is then hardened. U.S. Pat. No. 4,287,649 to Kohler also discloses a paper feeding roller made of a core of foamed cellular resilient material and an annular skin of a relatively hard elastic material disposed on the core.

Elastomeric feed rolls are made of hard, solid elastomers such as SBR (styrene butadiene rubber), neoprene, natural rubber, synthetic polyisoprene or several others. These solid elastomers possess high coefficient of friction and high compressive modulus. However, preferred document feed rolls comprise a low compression modulus (high compliance) cellular elastomer. These rolls result in large contact area (footprint) and low contact pressure. Document skewing and damage, and elastomer wear are eliminated or greatly reduced. Such feed rolls are commonly cellular polyurethane elastomers, one of which is described in U.S. Pat. No. 4,287,649 to Kohler.

One drawback to the use of the above mentioned materials is that these materials require the use of processing aids, plasticizers, and/or other additives when producing a solid elastomer feed roll. A processing aid is generally incorporated into the elastomer compound in order to promote flow of the compound under shear or heat. Commonly used processing aids include fatty acid soaps such as stearic acid, paraffinic materials, and low molecular weight polyethylene or other olefinic materials, among many others. A plasticizer is incorporated in the material to increase its workability, flexibility, or distensibility. Commonly used plasticizers include DOA (bis(2-ethylhexyl) adipate) and DOP (bis(2-ethylhexyl) phthalate), among many others. Other commonly used migratory additives include various surfactants and compatibilizers used to stabilize the foam and to compatibilize the elastomer blends. The above-described additives are migratory, and their use in solid elastomer feed rolls and other paper feeding components has been shown to impair the surface of photographic paper by marking the paper's surface when it is used in a paper feed device.

SUMMARY OF THE INVENTION

The above-described and other problems and deficiencies of the prior art are overcome or alleviated by the present elastomeric document feed component and method for manufacturing the same, comprising a foamed epichlorohydrin elastomer comprising an epichlorohydrin elastomer, a blowing agent and a curing agent. In addition, the present elastomeric document feed component preferably includes cure activators, polymerization accelerators and a filler. The foamed epichlorohydrin elastomer sponge provides a document feed component that has a high dynamic coefficient of friction, low hardness, low compression set, and excellent resistance to ultraviolet light and ozone. Preferably, the average dynamic coefficient of friction is in the range of about 1.0 to about 3.0, more preferably in the range of about 1.2 to about 3.0, and most preferably in the range of about 1.5 to about 2.9. Shore O Hardness is preferably in the range of about 2 to about 85, more preferably in the range of about 10 to about 60, and most preferably in the range of about 15 to about 55. Average compression set is preferably less than about 12%, more preferably less than about 10%, and most preferably less than about 7%. Resistance to wear is preferably less than about 0.5, more preferably less than about 0.01, and most preferably less than about 0.005 g/hr as measured by a wear test using a nip load of 1 IN/inch, at 600 RPM and a stainless steel opposing surface having an Ra of 1.0–1.5 microns. Furthermore, the feed component provides excellent stability of the above-mentioned properties over extended periods of time.

An important feature of the present composition is that the use of a foamed epichlorohydrin elastomer sponge as a component of a document feed roller does not require the use of processing aids, plasticizers, and/or other migratory additives. The use of processing aids, plasticizers, and/or other migratory additives in elastomer feed rollers leads to displeasing markings on the surface of paper used in the feed device. In addition, the present feed component has all the desirable attributes of the prior art cellular elastomeric feed rolls with none of their limitations. Thus, the feed rolls of the present invention are superior to those known from the prior art and provide a more commercially attractive and valuable material.

These and other features of the invention will become better understood with reference to the following detailed description, drawings, and appended claims.

BRIEF DESCRIPTION OF THE DRAWINGS

For the purpose of illustrating the invention, there are shown in the drawing forms which are presently preferred, it being understood that this invention is not limited to the precise arrangements and instrumentalities shown. Referring now to the drawings wherein like elements are numbered alike in the several FIGURES:

FIG. 1 is a side elevational view of one form of the improved roller of the present invention;

FIG. 2 is a side elevational view of the improved feed component of the present invention, wherein the feed component is in the form of a belt.

DETAILED DESCRIPTION OF THE PREFERRED EMBODIMENTS

In the following description, the invention will be illustratively discussed as a paper feed component, but it will be understood that it is applicable to a document feeder for any sheet material.

The document feed component in accordance with the present invention comprises a foamed epichlorohydrin elastomer which itself comprises an epichlorohydrin elastomer, a blowing agent and a curing agent. In addition, the present invention optionally includes cure activators, polymerization accelerators and filler material. The document feed component of this invention does not require the use of processing aids, plasticizers, or other migratory additives. Even rollers made from mechanically frothed cellular elastomers, for example polyurethane, contaminate the surface of the paper used in the feeding device due to the presence of surfactants in the elastomeric compositions. The use of surfactants in these compositions is necessary because it provides stabilization to the cells in the cellular elastomers. Chemically blown materials are processed using the same processing aids and or plasticizers described above, and thus have the same disadvantages. Thus, by the removal of all processing aids, plasticizers, and migratory additives, the document feed component of the present invention has the advantage of not contaminating paper or other media with which it comes into contact, even for extended periods of time. Furthermore, the present invention is characterized by a high initial coefficient of friction and low hardness, without the use of plasticizers, and it exhibits excellent stability of these properties over an extended period of time.

Elastomer

In a preferred embodiment, the elastomer used in the document feed component of this invention is a foamed epichlorohydrin elastomer. One suitable elastomer is an epichlorohydrin terpolymer composed of about 70 weight % epichlorohydrin, about 30 weight % ethylene oxide, and about 6 weight % alkyl glycidyl ether, commercially available from Zeon Chemicals, Inc., under the trade name HYDRIN T3100. Other suitable elastomers include the homopolymer of epichlorohydrin, the copolymer of epichlorohydrin and ethylene oxide, the aforementioned terpolymer in other ratios, and combinations thereof.

Blowing Agent

Blowing agents, sometimes referred to as foaming agents, generate cells in polymeric materials. During the expansion of the substrate by the blowing agent, cells are initiated and grow to produce the final foam. Preferred blowing agents in accordance with the present invention decompose around the cure temperature of the rubber, and include those known in the art such as azodicarbonamides, for example a modified activated azodicarbonamide commercially available from Uniroyal Chemical Company under the trade name Celogen 765; p,p'-oxybis(benzenesulfonyl hydrazide); p,p-oxybis(N-nitroso-N-methyl) benezenesulfonamide; or sodium bicarbonate. The blowing agent is present in an amount of between about 0.5 to about 5 part per hundred of elastomer (pph), preferably in an amount of about 1 pph.

Curing Agent

The composition further includes a curing agent, usually in the form of sulfur or a peroxide. Peroxide vulcanization occurs when the composition is heated and the peroxide decomposes to form free radicals, which then initiate crosslinking of the polymeric chains. Preferred peroxide curing agents are free radical cure initiators such as organic peroxides, e.g., dicumyl peroxide; p,p'-bis(t-butylperoxy) diisopropylbenzene; or 2,5-di(t-butyl peroxy)hexane. Sulfur, an alternative curing agent to peroxides, creates bridges between the rubber chains during the vulcanization process and is the preferred curing agent in accordance with the present invention. Other suitable curing agents include sulfur derivatives such as ethylene thiourea, 2,5-dimercapto-1,3,4-thiazole, trithiocyanuric acid, and 2,4,6-trimercapto-s-triazine. The curing agent is provided in an amount of between about 0.3 to about 3 pph, and more preferably in an amount of about 0.5 pph.

Cure Activator

A cure activator is optionally included in the composition of the present invention to initiate cure. Preferred activators are known in the art, for example metal oxides such as zinc oxide, and metal stearates. The activator is provided in an amount of between about 3 to about 8 pph.

Cure Accelerators

The composition may optionally include a cure accelerator. The polymerization accelerators suitable for use include sulfides and dithiocarbamates, for example tetramethylthiuram disulfide (TMTD). Other suitable accelerators are tetramethylthiuram monosulfide (TMTM), tetraethylthiuram disulfide, mercaptobenzothiazole disulfide (MBTS), zinc di-n-butyldithiocarbamate, and zinc dimethyldithiocarbamate. If present, the accelerator is preferably used in an amount of about 1.0 to about 2.0 pph.

Filler

The elastomer optionally includes filler material. The addition of filler reinforces the elastomer and improves its processability. Examples of preferred fillers include carbon blacks, e.g., 325 BA black (commercially available from Keystone Filler & Mfg. Co.), diatomaceous earth, clay, alumina, talc, silica, and calcium carbonate. It is preferred that if a filler material is used in the present invention, it is present in amounts ranging from about 5 to about 45 pph.

The present foamed epichlorohydrin elastomer sponge provides a document feed component that has a high coefficient of friction, low hardness, low compression set, and excellent resistance to ultraviolet light and ozone. Unlike the frictional property requirements for charge rollers, printing blankets, or automobile tires, the frictional properties of a foamed elastomeric document feed component are very important.

Another important material property for document fed components is good resistance to wear. It is further desirable for the worn surface of a document feed component to be as similar as possible to the surface of a new document feed component. This is referred to as "controlled wear", and refers to the lack a glazing, gouging, or other surface degradation that adversely affects document feed performance. The present document feed components provide good resistance to wear and good controlled wear. As the surface of the present document feed components wear with use, the exposed surface underneath the original surface possesses essentially the same properties as the new document feed component. This is due to the microcellular structure of the foam.

Another important material property for document feed components is good resistance to compression, especially when the components are exposed to the environmental conditions of a combination of elevated temperature and humidity.

Another advantage of the present document feed components is that they do not transfer any significant amount of constituent material of the document feed components to the surface of the documents they come in contact with; that is, the present document feed components do not contaminate the document surface. This is due to the lack of use of migrating oils and processing aids in the present document feed components formulations. Lack of document surface contamination is especially advantageous when the document feed components are used in applications such as conveying photographic media or high gloss ink jet recording media. Preferred values for coefficient of friction, hardness, compression set, resistance to wear, and contaminant migration to document surface are set forth in Table 1 below.

TABLE 1

| Property | Test Method | Range | Preferred Range | Most Preferred Range |
| --- | --- | --- | --- | --- |
| Compression Set (%) | ASTM D395 Method B: % original thickness | <12 | <10 | <7 |
| Shore O Hardness | ASTM D2240 | 2–85 | 10–60 | 15–55 |
| Coefficient of Friction | ASTM D-1894 | 1.0–3.0 | 1.2–3.0 | 1.5–2.9 |
| Resistance to wear (g/hr) | Nip load 1.IN/in, 600 RPM, stainless steel opposing surface (Ra = 1.0–1.5 μm) | <0.05 | <0.01 | <0.005 |

In the practice of the present invention, the foamed epichlorohydrin elastomer preferably defines a drive means for a document feeding device, the drive means having the shape of a roller, wheel, belt, pad or the like. Rollers and other shaped paper driving components having high coefficients of friction in accordance with the present invention result in minimum slippage over a service life; they also eliminate misfeeds and jams due to skewing and cause no document damage, e.g., paper contamination by contaminating additives.

Referring now to FIG. 1, the improved roller 10 comprises a base 12 of foamed epichlorohydrin elastomer sponge, which has been cut to have a central shaft receiving opening 14 having shaft 18 disposed therein, and an outer cylindrical surface 16. The base 12 is an epichlorohydrin elastomer in accordance with the present invention. The cellular foam may have any desired density range that will give the feed component the above-mentioned characteristics, such ranges being between about 20 pounds per cubic foot to about 55 pounds per cubic foot.

Referring now to FIG. 2, a feed component of the present invention is illustrated in the form of a belt 20. Belt 20 comprises the foamed epichlorohydrin elastomer sponge in accordance with the present invention. The cellular foam may have any desired density range that will give the feed component the above-mentioned characteristics, such ranges being between about 20 pounds per cubic foot to about 55 pounds per cubic foot. The document-feeding component of the present invention may be manufactured by methods known to those of ordinary skill in the art. The components of the material are mixed, for example in an internal mixer such as a Banbury mixer. The material is extruded as a tube and cut to length, for example 10 inches. The tubes are then slid onto a steel mandrel and placed on a rack. Racks are loaded into an autoclave and cured, for example at 350° F. for 30 minutes under a pressure of 25 pounds per square inch (psi). The exact conditions may be empirically determined; especially the pressure applied during cure, and are adjusted to achieve a desired target foamed elastomer density. Following the autoclave cure, tubes are removed from the mandrels and postbaked for 4 hours at 250° F. For a roller in accordance with the present invention, the tubes are next ground, sliced, and glued to shafts as necessary for a particular roller design.

The following non-limiting examples further describe the document feed component of the present invention.

EXAMPLES

Chemicals, sources, and descriptions are listed in Table 2 below.

TABLE 2

| Trade Name | Source | Description |
| --- | --- | --- |
| Hydrin T3100 | Zeon Chemicals Inc. | Epichlorohydrin/ethylene oxide/alkyl glycidyl ether |
| Elastozinc | Elastochem, InC | Zinc oxide |
| V(MT)D75 | Rhein Chemie | Tetramethylthiuram (TMTD) |
| 325 BA | Keystone Filler | Coal |
| PB(RM-S)-80 | Elastochem, InC | Sulfur |
| Celogen 765 | Uniroyal Chemical | Modified activated azodicarbonamide |
| Hydrin T-65 | Zeon Chemicals | Epichlorohydrin/ethylene oxide/alkyl glycidyl ether |
| Hydrin T3106 | Zeon Chemicals | Epichlorohydrin/ethylene oxide/alkyl glycidyl ether |
| Hydrin 2000 | Zeon Chemicals | Epichlorohydrin/ethylene oxide copolymer |
| Hydrin 1000 | Zeon Chemicals | Epichlorohydrin homopolymer |

In a preferred embodiment, the components in amounts listed in Table 3 below are mixed, for example in an internal mixer such as a Banbury mixer. The material is extruded as a tube and cut to length, for example 10". The tubes are then slid onto a steel mandrel and placed on a rack. Racks are loaded into an autoclave and cured, for example at 350° F. for 30 minutes under a pressure of 25 psi (pounds per square inch). The exact conditions are empirically determined, especially the pressure applied during cure, and are adjusted to achieve a desired target foamed elastomer density. Following the autoclave cure, tubes are removed from the mandrels and postbaked for 4 hours at 250° F. The tubes are next ground, sliced, and glued to shafts as necessary for a particular roller design.

TABLE 3

| Component | Amount (pph)* |
|---|---|
| Hydrin T3100 | 100 |
| Elastozinc | 5 |
| V(MT)D75 | 1.5 |
| 325 BA | 15 |
| PB(RM-S)-80 | 0.5 |
| Celogen 765 | 1 |
| Celite 350 | 15 |

*parts per hundred of resin (rubber)

Document feed components prepared in accordance with the present invention exhibit high initial coefficient of friction, low hardness, low compression set, and excellent resistance to degradation of these properties due to exposure to ultraviolet light and ozone. The present document feed components maintain these advantageous properties over time, due at least in part to the components ability to resist glazing, gouging, and other surface degradation that adversely affects document feed performance. The surface of the present document feed component wears with use in such a way that the newly exposed surface is essentially the same as the initial surface due to the microcellular structure of the foam. Tables 4–7 below show the test results of document feed components prepared according to the Example, and tested for coefficient of friction, low hardness, low compression set, and resistance to degradation of these properties over time and upon exposure to ultraviolet light and ozone.

Table 4 shows the average dynamic coefficient of friction as measured by ASTM D-1894 for a document feed component prepared according to the Example over a period of 6 months.

TABLE 4

| | Average Dynamic Coefficient of Friction | | |
|---|---|---|---|
| Time (Months) | 23° C., 50% Relative Humidity | 70° C., dry | 70° C., 100% Relative Humidity |
| 0 | 2.03 | 2.03 | 2.03 |
| 0.5 | 1.97 | 1.676 | 2.0075 |
| 1 | 1.91 | 1.664 | 1.916 |
| 2 | 1.73 | 1.586 | 2.166 |
| 3 | 1.674 | 1.394 | 1.45 |
| 6 | 1.688 | 1.664 | 1.536 |

As can be seen in Table 4, the present document feed component exhibits an average dynamic coefficient of friction that is stable within the range of about 1.674 to about 2.03 at room ambient temperature of about 23° C. and about 50% relative humidity. In extremely dry and warm environments, the average dynamic coefficient of friction is stable within the range of 1.394 to about 2.03. In extremely humid and warm environments, the average dynamic coefficient of friction is stable within the range of about 1.45 to about 2.03.

Table 5 provides Shore O Hardness values as measured by ASTM D2240 for the document feed component of the present invention over a period of six months over a range of environmental temperatures and humidities.

TABLE 5

| | Average Shore O Hardness | | |
|---|---|---|---|
| Time (Months) | 23° C., 50% Relative Humidity | 70° C., dry | 70° C., 100% Relative Humidity |
| 0 | 27.6 | 27.6 | 27.6 |
| 0.5 | 28 | 34 | 38 |
| 1 | 24 | 29 | 37.5 |
| 2 | 24.5 | 45.5 | 42.5 |
| 3 | 35.5 | 38 | 48 |
| 6 | 32 | 37 | 40.5 |

As shown in Table 5, the document feed component of the present invention exhibits stable average Shore O Hardness properties over a range of environmental temperatures and humidities. For example, at room ambient temperatures of about 23° C. and about 50% relative environmental humidity, the document feed component of the present invention exhibited Shore O Hardness measurements of about 24 to about 27.6.

Table 6 provides compression set values for the document feed component of the present invention over a period of about 6 months. Compression set was measured according to test method D395 Method B-% original thickness.

TABLE 6

| | Average Compression Set (%) | | |
|---|---|---|---|
| Time (Months) | 23° C., 50% Relative Humidity | 70° C., dry | 70° C., 100% Relative Humidity |
| 0 | 6.62 | 6.62 | 6.62 |
| 0.5 | 3.95 | 2.25 | 4.35 |
| 1 | 7.5 | 2.45 | 3.8 |
| 2 | 6.6 | 1.6 | 3.55 |
| 3 | 2.7 | 3.3 | 4.3 |
| 6 | 3.7 | 1.85 | 7.8 |

As seen in Table 6, average % compression set is stable over a range of environmental humidities and temperatures.

In order to determine the effect of ultraviolet light and ozone on the document feed components, average initial values for % compression set, Shore O Hardness, compressive force deflection (CFD) and dynamic coefficient of friction were measured for two document feed components prepared in accordance with the present invention. CFD was measured using test method ASTM D3574 (test C). One of the documents feed components was exposed to ultraviolet light of 0.35 watts/meter$^2$ intensity for about 2 weeks. The other document feed component was exposed to 100 pph per meter ozone for about 3 days. Table 7 provides average compression set, Shore O Hardness, CFD, and dynamic coefficient of friction values for the unexposed document feed component and for the document feed component after exposure to ultraviolet light and ozone.

TABLE 7

Document Feed Component Properties Before and After Exposure to Ultraviolet Light and Ozone

|  | Unexposed | Exposure to Ultraviolet Light | Exposure to Ozone |
| --- | --- | --- | --- |
| Average % Compression Set | 4.7 | 8.3 | 5.9 |
| Average Shore O Hardness | 26 | 22 | 25 |
| Average CFD (psi) | 21.12 | 21.02 | 21.58 |
| Average Dynamic Coefficient of Friction | 2.83 | 2.94 | 2.82 |

As shown in Table 7, the document feed components of the present invention are resistant to degradation upon exposure to ultraviolet light and ozone.

As discussed earlier, the roller prepared in accordance with the present invention is aptly suited for use in conjunction with any number of standard devices employing a paper feeding component such as photocopiers, printers and automatic teller machines, to name just a few, without contamination of paper or film. It has advantageous properties, such as coefficient of friction, in order to adequately grip the paper and drive it along the desired path without slippage or skewing. The high compliance results in high contact area and low pressure between the roller and the document to be fed, as well as good mechanical wear and resistance properties. The use of an epichlorohydrin elastomer provides such desired properties and thereby results in an improved document-feeding component.

While preferred embodiments have been shown and described, various modifications and substitutions may be made thereto without departing from the spirit and scope of the invention. Accordingly, it is understood that the present invention has been described by way of illustrations and not limitation.

What is claimed is:

1. In a document handling device having a document feed component, the improvement the document fed component comprising a foamed epichlorohydrin consisting essentially of:
   an epichlorohydrin elastomer;
   a blowing agent; and
   a curing agent;
   wherein the document feed component has a dynamic coefficient of friction in the range of about 1.0 to about 3.0, a Shore O hardness in the range of about 2 to about 85, a compression set of less than about 12%, and a resistance to wear of less than about 0.05 g/hr as measured by a wear test using a nip load of 1 IN/inch, at 600 RPM and a stainless steel opposing surface having an Ra of 1.0–1.5 microns.

2. The document feed component of claim 1, wherein:
   the epichlorohydrin elastomer is a terpolymer, copolymer or homopolymer of epichlorohydrin or a terpolymer of epichlorohydrin, ethylene oxide, and alkyl glycidyl ether or a copolymer of epichlorohydrin and ethylene oxide monomer;
   the curing agent is an organic peroxide, sulfur, ethylene thiourea, 2,5 dimercapto-1,3,4-thiazole, trithiocyanuric acid, 2,4,6-trimercapto-s-triazine, or a mixture thereof; and
   the blowing agent is an azodicarbonamide p,p'-oxybis (benzenesulfonyl hydrazide), p,p-oxybis(N-nitroso-N-methyl)benezenesulfonamide, sodium bicarbonate, or a combination thereof.

3. The document feed component of claim 1, further comprising a cure accelerator, a cure activator, filler, or a combination thereof.

4. The document feed component of claim 3, wherein:
   the cure activator is a metal oxide or metal stearate, the metal oxide is zinc oxide;
   the cure accelerator is selected from the group consisting of tetramethylthiuram disulfide, tetramethylthiuram monosulfide, tetraethylthiuram disulfide, mercaptobenzothiazole disulfide, zinc di-n-butyldithiocarbamate, zinc dimethyldithiocarbamate, and a combination thereof; and
   the filler is carbon black, diatomaceous earth, clay, alumina, talc, silica, calcium carbonate, or a combination thereof.

5. The document feed component of claim 1, wherein:
   the component has the shape of a roller, wheel, belt, or pad.

6. The document feed component of claim 1, wherein:
   the component has a compression set less than about 10%.

7. The document feed component of claim 6, wherein:
   the component has a compression set less than about 7%.

8. The document feed component of claim 1, wherein:
   the component has a Shore O Hardness in the range from about 10 to about 60.

9. The document feed component of claim 8, wherein:
   the component has a Shore O Hardness of about 10 to about 55.

10. The document feed component of claim 1, wherein:
    the component has a coefficient of dynamic friction in the range from about 1.2 to about 3.0.

11. The document feed component of claim 10, wherein:
    the component has a coefficient of dynamic friction in the range from about 1.5 to about 2.9.

12. The document feed component of claim 1, wherein:
    the component has a resistance to wear of less than about 0.01 g/hr.

13. The document feed component of claim 12, wherein:
    the component has a resistance to wear less than about 0.005 g/hr.

14. The document feed component of claim 1, wherein:
    the dynamic coefficient of friction, the Shore O Hardness, and compressive force deflection are stable over at least about six months under standard conditions of use.

15. The document feed component of claim 1, wherein:
    the document feed component has a dynamic coefficient of friction in the range of about 1.2 to about 3.0, a Shore O hardness in the range of about 10 to about 60, a compression set of less than about 10%, and a resistance to wear of less than about 0.01 g/hr as measured by a wear test using a nip load of 1 IN/inch, at 600 RPM and a stainless steel opposing surface having an Ra of 1.0–1.5 microns.

16. The document feed component of claim 1, wherein:
    the document feed component has a dynamic coefficient of friction in the range of about 1. 5 to about 2.9, a Shore O hardness in the range of about 10 to about 55, a compression set of less than about 7%, and a resistance to wear of less than about 0.001 g/hr as measured by a wear test using a nip load of 1 IN/inch, at 600 RPM and a stainless steel opposing surface having an Ra of 1.0–1.5 microns.

17. A method of making an improved document feed component for a document handling device, comprising:
  foaming an elastomer precursor solution consisting essentially of an epichlorohydrin elastomer, a blowing agent and a curing agent; and
  curing the foamed solution to form a document feed component, wherein the document feed component has a dynamic coefficient of friction in the range of about 1.0 to about 3.0, a Shore O hardness in the range of about 2 to about 85, a compression set of less than about 12%, and a resistance to wear of less than about 0.05 g/hr as measured by a wear test using a nip load of 1 IN/inch, at 600 RPM and a stainless steel opposing surface having an Ra of 1.0–1.5 microns.

18. The method of claim 17, wherein:
  the epichlorohydrin elastomer is a terpolymer, copolymer or homopolymer of epichlorohydrin or a terpolymer of epichlorohydrin, ethylene oxide, and alkyl glycidyl ether or a copolymer of epichlorohydrin and ethylene oxide monomer;
  the curing agent is an organic peroxide, sulfur, ethylene thiourea, 2,5 dimercapto-1,3,4-thiazole, trithiocyanuric acid, 2,4,6-trimercapto-s-triazine, or a mixture thereof; and
  the blowing agent is an azodicarbonamide p,p'-oxybis (benzenesulfonyl hydrazide), p,p-oxybis(N-nitroso-N-methyl)benezenesulfonamide, sodium bicarbonate, or a combination thereof.

19. The method of claim 17, wherein the epichlorohydrin elastomer precursor solution further comprises:
  a cure accelerator, a cure activator, filler, or a combination thereof.

20. The method of claim 19, wherein:
  the cure activator is a metal oxide or metal stearate, the metal oxide is zinc oxide;
  the cure accelerator is selected from the group consisting of tetramethylthiuram disulfide, tetramethylthiuram monosulfide, tetraethylthiuram disulfide, mercaptobenzothiazole disulfide, zinc di-n-butyldithiocarbamate, zinc dimethyldithiocarbamate, and a combination thereof; and
  the filler is carbon black, diatomaceous earth, clay, alumina, talc, silica, calcium carbonate, or a combination thereof.

21. The method of claim 17, wherein:
  the cured document feed component has the shape of a roller, wheel, belt, or pad.

22. The method of claim 17, wherein:
  the cured document feed component has a compression set of less than about 10%.

23. The method of claim 22, wherein:
  the cured document feed component has a % compression set of less than about 7%.

24. The method of claim 17, wherein:
  the cured document feed component has a Shore O Hardness in the range of about 10 to about 60.

25. The method of claim 24, wherein:
  the cured document feed component has a Shore O Hardness in the range of about 10 to about 55.

26. The method of claim 17, wherein:
  the cured document feed component has a coefficient of dynamic friction in the range of about 1.2 to about 3.0.

27. The method of claim 26, wherein:
  the cured document feed component has a coefficient of dynamic friction in the range of about 1.5 to about 2.9.

28. The method of claim 17, wherein:
  the cured document feed component has a resistance to wear of less than about 0.01 g/hr.

29. The method of claim 28, wherein:
  the cured document feed component has a resistance to wear of less than about 0.001 g/hr.

30. The method of claim 17, wherein:
  the average dynamic coefficient of friction, the Shore O Hardness, compression set, and coefficient of dynamic friction of the cured document feed component are stable over at least about six months under standard conditions of use.

31. The method of claim 17, wherein:
  the document feed component has a dynamic coefficient of friction in the range of about 1.2 to about 3.0, a Shore O hardness in the range of about 10 to about 60, a compression set of less than about 10%, and a resistance to wear of less than about 0.01 g/hr as measured by a wear test using a nip load of 1 IN/inch, at 600 RPM and a stainless steel opposing surface having an Ra of 1.0–1.5 microns.

32. The method of claim 17, wherein:
  the document feed component has a dynamic coefficient of friction in the range of about 1.5 to about 2.9, a Shore O hardness in the range of about 10 to about 55, a compression set of less than about 7%, and a resistance to wear of less than about 0.001 g/hr as measured by a wear test using a nip load of 1 IN/inch, at 600 RPM and a stainless steel opposing surface having an Ra of 1.0–1.5 microns.

* * * * *